US007180890B2

(12) United States Patent
Bushnell et al.

(10) Patent No.: US 7,180,890 B2
(45) Date of Patent: Feb. 20, 2007

(54) PHONE CONNECTOR COMPONENT OPERATIONALLY CONNECTABLE THROUGH PACKET NETWORK TO ANY SELECTED ONE OR MORE SWITCH COMPONENTS FOR ORIGINATING AND/OR TERMINATING TELECOMMUNICATION SERVICE

(75) Inventors: William Jackson Bushnell, St. Charles, IL (US); David Edward Heeren, San Antonio, TX (US)

(73) Assignee: Lucent Technologies Inc., Murray Hill, NJ (US)

( * ) Notice: Subject to any disclaimer, the term of this patent is extended or adjusted under 35 U.S.C. 154(b) by 863 days.

(21) Appl. No.: 09/825,645

(22) Filed: Apr. 4, 2001

(65) Prior Publication Data

US 2002/0145997 A1 Oct. 10, 2002

(51) Int. Cl.
*H04L 12/66* (2006.01)
*H04L 12/28* (2006.01)

(52) U.S. Cl. ............... 370/352; 370/401; 379/900

(58) Field of Classification Search ........ 370/352–356, 370/260–261, 401, 466; 379/201.01, 211.04, 379/900
See application file for complete search history.

(56) References Cited

U.S. PATENT DOCUMENTS

| | | | | |
|---|---|---|---|---|
| 5,309,028 A | * | 5/1994 | Brown et al. | 379/201.01 |
| 5,590,127 A | * | 12/1996 | Bales et al. | 370/260 |
| 5,600,654 A | * | 2/1997 | Brown et al. | 370/524 |
| 5,999,612 A | * | 12/1999 | Dunn et al. | 379/212.01 |
| 6,445,694 B1 | * | 9/2002 | Swartz | 370/352 |
| 6,640,239 B1 | * | 10/2003 | Gidwani | 709/203 |
| 6,683,870 B1 | * | 1/2004 | Archer | 370/356 |
| 6,754,224 B1 | * | 6/2004 | Murphy | 370/432 |
| 6,771,763 B1 | * | 8/2004 | Hagirahim et al. | 379/219 |
| 6,791,970 B1 | * | 9/2004 | Ng et al. | 370/352 |
| 6,791,974 B1 | * | 9/2004 | Greenberg | 370/352 |
| 6,798,767 B1 | * | 9/2004 | Alexander et al. | 370/352 |

FOREIGN PATENT DOCUMENTS

| | | |
|---|---|---|
| EP | 0 602 856 | 6/1994 |
| EP | 0602856 | 6/1994 |
| EP | 0 880 255 | 11/1998 |
| EP | 0880255 | 11/1998 |
| WO | WO 97/14238 | 4/1997 |

OTHER PUBLICATIONS

Jonathan Rosenberg, Henning Schulzrinne, Bell Laboratories, Columbia University; "Internet Telephony Gateway Location"; San Francisco, CA; USA; Mar. 29, 1998; 5 Pgs.
Rosenberg, J. et al., "Internet Telephony Gateway Location", Infocom '98, Mar. 29, 1998, pp. 488-496, IEEE, New York, USA.

(Continued)

*Primary Examiner*—Huy D. Vu
*Assistant Examiner*—Nittaya Juntima

(57) ABSTRACT

A phone of a system comprises a connector component that is operationally connectable through a packet network to any selected one or more of a plurality of switch components. The any selected one or more of the plurality of switch components serve to provide one or more of originating and terminating telecommunication service to the phone.

6 Claims, 6 Drawing Sheets

OTHER PUBLICATIONS

Cook, John; Sheppard, Phil; *ADSL and VADSL Splitter Design and Telephony Performance*; IEEE Journal on Selected Areas in Communications; Dec. 13, 1995, No. 9; New York, NY; pp. 1634-1642.

"10base1; bundled T1/E1 module; E1; E1 (CEPT T1);" http://www.worldcom.com/cgi-bin/search?placetosearch=term&searchfilter=contains&searchstring=e1&pagenum=0&page=1; Worldcom, Clinton, MS; Dec. 12, 2000.

"E3;" http://www.worldcom.com/cgi-bin/search?placetosearch=term&searchfilter=contains&searchstring=c3&pagenum=0&page=1; Worldcom, Clinton, MS; Dec. 12, 2000.

"Enhanced DS1 Test Access Unit (eDTAU);" http://www.worldcom.com/cgi-bin/search?placetosearch=term&searchfilter=contains&searchstring=ds1&pagenum=0&page=1; Worldcom, Clinton, MS; Dec. 12, 2000.

"Simply ADSL;" http://msnhomepages.talkcity.com/ReportersAlley/redbox99/2adsl.htm; Microsoft Corp., Redmond, WA; Dec. 8, 1999.

"Class 5 Switch;" http://www.techweb.com/encyclopedia/defineterm?term=class+5+switch; pp. 1-3; CMP Media, Inc., Manhasset, NY;Nov. 16, 2000.

"ATM, Asynchronous Transfer Mode;" http://www.techweb.com/encyclopedia/defineterm?term=atm; pp. 1-9; CMP Media, Inc., Manhasset, NY;Nov. 14, 2000.

"PSTN, Public Switched Telephone Network;" http://www.techweb.com/encyclopedia/defineterm?term=pstn; pp. 1-2; CMP Media, Inc., Manhasset, NY;Nov. 19, 2000.

"POTS Splitter;" http://www.techweb.com/encyclopedia/defineterm?term=POTSSPLITTER&exact=1; pp. 1-2; CMP Media, Inc., Manhasset, NY;Nov. 19, 2000.

"Central Office;" http://www.techweb.com/encyclopedia/defineterm?term=central+office; pp. 1-4; CMP Media, Inc., Manhasset, NY;Nov. 10, 2000.

"POTS, Plain Old Telephone Service", http://www.worldcom.com/tools-resources/communications_library/search?placetosearch+term&searchfilter=is&searchstring=plain+old+telephone+service+%; pp. 1-2; Worldcom, Clinton, MS; Nov. 9, 2000.

"Centrex; CCSR, Centrex customer station rearrangement; Centrex CO; Centrex, CU;" http://www.world.com/cgi-bin/search?placetosearch=term&searchfilter=contains&searchstring=centex&pagenum=0& pa; Worldcom, Clinton, MS; Jan. 26, 2001.

"Q.931;" http://www.freesoft.org/CIE/Topics/126.htn, pp. 1-6, Feb. 4, 2001; B. Baccala.

* cited by examiner

100

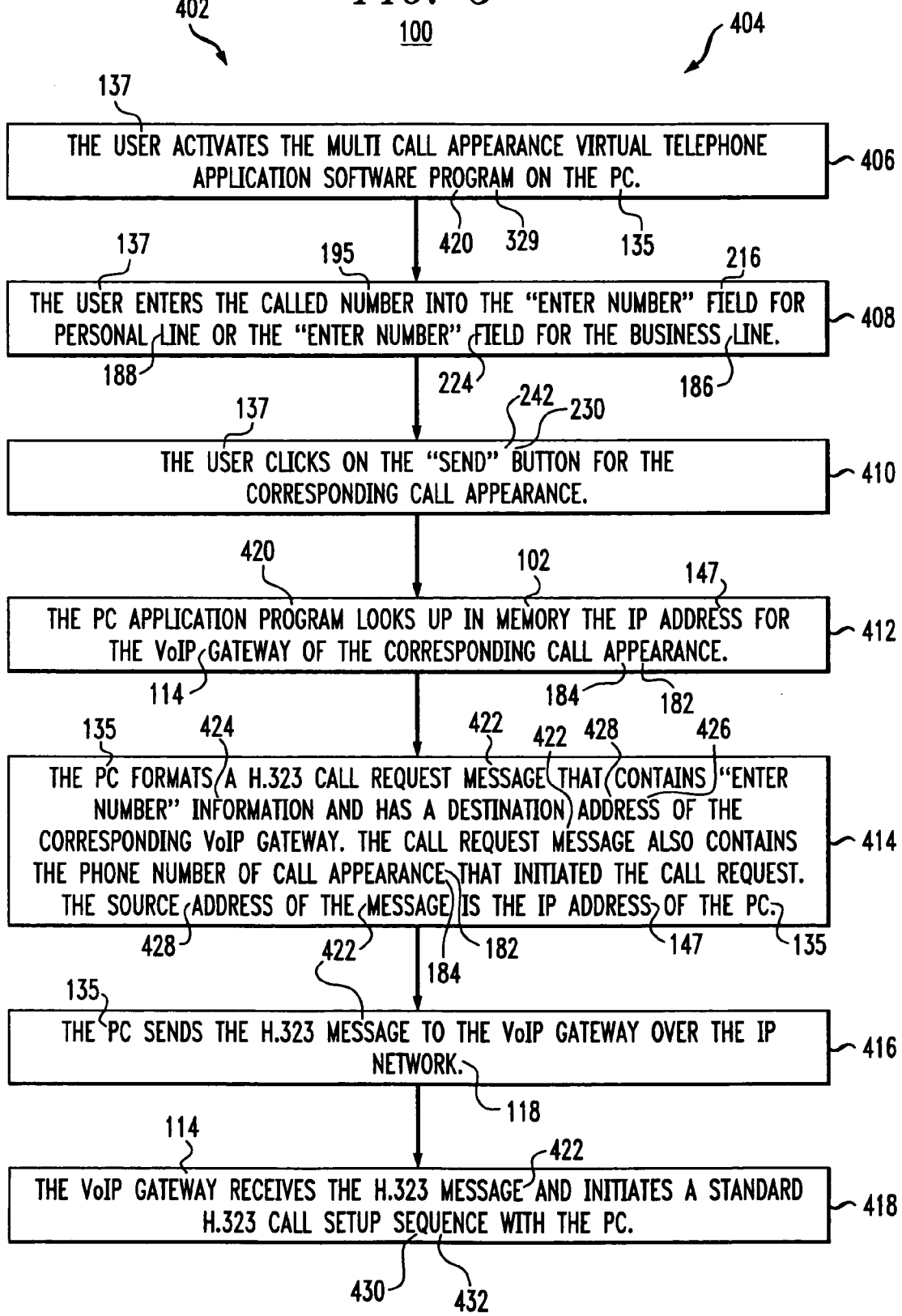

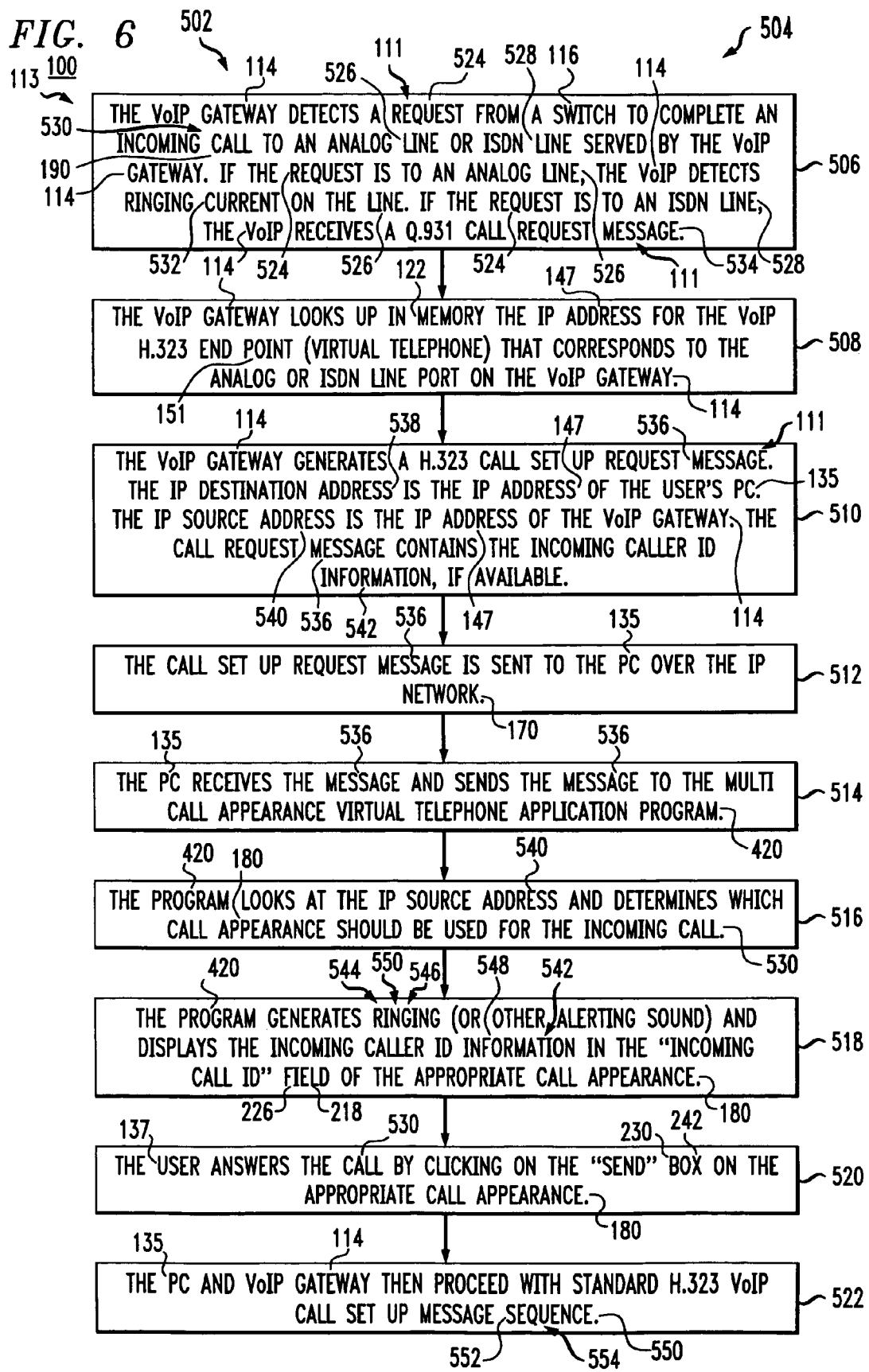

PHONE CONNECTOR COMPONENT OPERATIONALLY CONNECTABLE THROUGH PACKET NETWORK TO ANY SELECTED ONE OR MORE SWITCH COMPONENTS FOR ORIGINATING AND/OR TERMINATING TELECOMMUNICATION SERVICE

TECHNICAL FIELD

The invention in one embodiment relates generally to telecommunications and more particularly to operational connection of phones to switches.

BACKGROUND

One or more work at home users in one example install a second phone line for business calls, in addition to a first phone line for personal calls. The second phone line for business calls in one example is connected to a local switch that is different from the switch that serves the business lines of the company with which the user is associated. For users that work part time at home and part time at the office, such an arrangement in one example has a number of shortcomings.

One exemplary shortcoming relates to billing. In one example, if a user pays for the work at home line, then the user charges toll calls for business to a company credit card. In another example, if the company pays for the work at home line, then the user charges personal calls to a personal credit card. As exemplary disadvantages of such arrangements, credit card calls in one example are more time consuming to originate and expensive than direct dial calls.

A further exemplary shortcoming concerns an exemplary need for a user to run to answer a call. The user in one example has two lines at home, one line for personal use and one line for business use. The two lines in one example are connected to different phones that are located in different rooms of the user's home. If the user is in the user's home office and the personal line rings, then the user in one example undesirably needs to run to another room to answer the call.

In another example, a user connects a two line phone set to both the personal and business lines. As exemplary disadvantages, such two line phone sets are expensive, and undesirably require both the personal and business lines to be run through the house to the home office.

Thus, a need exists for enhanced operational connectability of a phone to one or more switches.

SUMMARY

Pursuant to one embodiment of the invention, shortcomings of the existing art are overcome and additional advantages are provided through the provision of a phone connector component operationally connectable through a packet network to any selected one or more switch components for originating and/or terminating telecommunication service.

The invention in one embodiment encompasses a system. The system includes a phone that comprises a connector component that is operationally connectable through a packet network to any selected one or more of a plurality of switch components. The any selected one or more of the plurality of switch components serve to provide one or more of originating and terminating telecommunication service to the phone.

Another embodiment of the invention encompasses a method. There is selected a phone that comprises a connector component that is operationally connectable through a packet network to any selected one or more of a plurality of switch components. The any selected one or more of the plurality of switch components serve to provide one or more of originating and terminating telecommunication service to the phone.

A further embodiment of the invention encompasses an article. The article includes a computer-readable signal-bearing medium. The article includes means in the medium for selecting a phone that comprises a connector component that is operationally connectable through a packet network to any selected one or more of a plurality of switch components. The any selected one or more of the plurality of switch components serve to provide one or more of originating and terminating telecommunication service to the phone.

These and other features and advantages of one embodiment of the invention will become apparent from the description, the accompanying drawings, and the claims.

BRIEF DESCRIPTION OF THE DRAWINGS

FIG. 5 represents another example of logic that is employable by the system of FIG. 1.

FIG. 6 represents a further example of logic that is employable by the system of FIG. 1.

DETAILED DESCRIPTION

In one embodiment of the invention, a phone connector component is operationally connectable through a packet network to any selected one or more switch components for originating and/or terminating telecommunication service. A detailed discussion of one exemplary embodiment of the invention is presented herein, for illustrative purposes.

Figure 1:
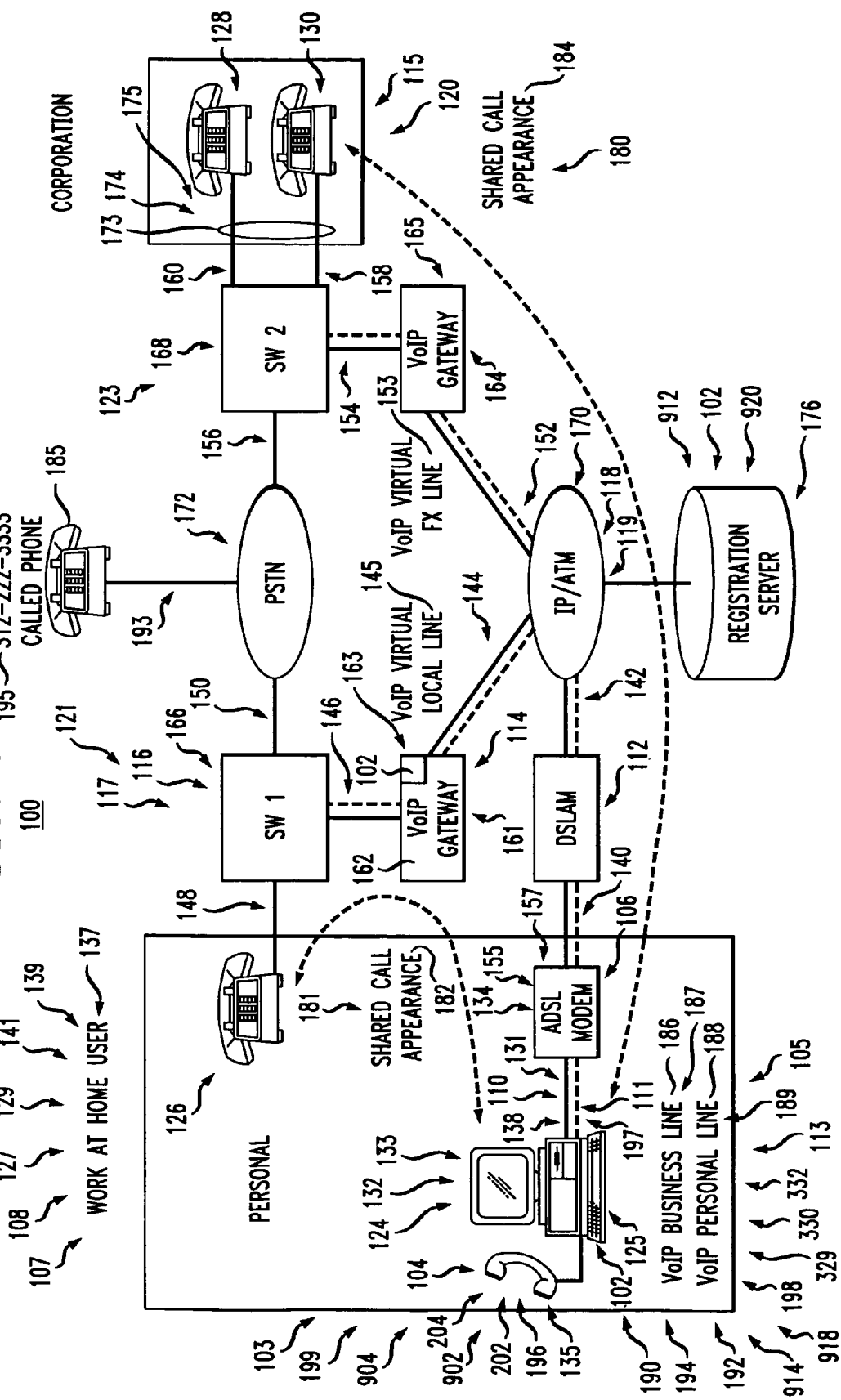
FIG. 1 is a functional block diagram of one example of a system that includes one or more instances of a phone, one or more instances of a modem, one or more instances of a (e.g., home) location, one or more instances of a passage, one or more instances of a multiplexor, one or more instances of a gateway, one or more instances of a switch component, one or more instances of a network, one or more instances of a (e.g., corporate) location, and one or more instances of a database.

Turning to FIG. 1, system 100, in one example, includes a plurality of components such as computer software and/or hardware components. A number of such components can be combined or divided in one example of system 100. System 100 in one example employs at least one computer-readable signal-bearing medium. One example of a computer-readable signal-bearing medium for system 100 comprises an instance of recordable data storage medium 102 such as one or more of a magnetic, electrical, optical, biological, and atomic data storage medium. In another example, a computer-readable signal-bearing medium for system 100 comprises a modulated carrier signal transmitted over a network comprising or coupled with system 100, for instance, one or more of a telephone network, a local area network ("LAN"), the Internet, and a wireless network. An exemplary component of system 100 employs and/or comprises a series of computer instructions written in or implemented with any of a number of programming languages, as will be appreciated by those skilled in the art.

Referring again to FIG. 1, system 100 in one example comprises one or more components, for example, one or more instances of phone 104, one or more instances of modem 106, one or more instances of location 107, one or more instances of passage 110, one or more instances of multiplexor 112, one or more instances of gateway 114, one or more instances of switch component 116, one or more instances of network 118, one or more instances of location 115, and one or more instances of registration server 920.

Still referring to FIG. 1, exemplary instances of phone 104 comprise phones 124, 126, 128, 130, and 185. Modem 106 in one example comprises one or more of asymmetric digital subscriber loop ("ADSL") modem 134, cable modem 155, and dial up modem 157. In one example, modem 106 provides an "always on" data connection to personal computer ("PC") 135. For example, modem 106 and personal computer 135 have therebetween a continuous connection for data communication.

Again referring to FIG. 1, location 107 in one example comprises home location 108. Location 115 in one example comprises one or more of corporate location 120, Centrex group 173, corporation Centrex 174, and corporate Centrex group 175.

Figure 4:
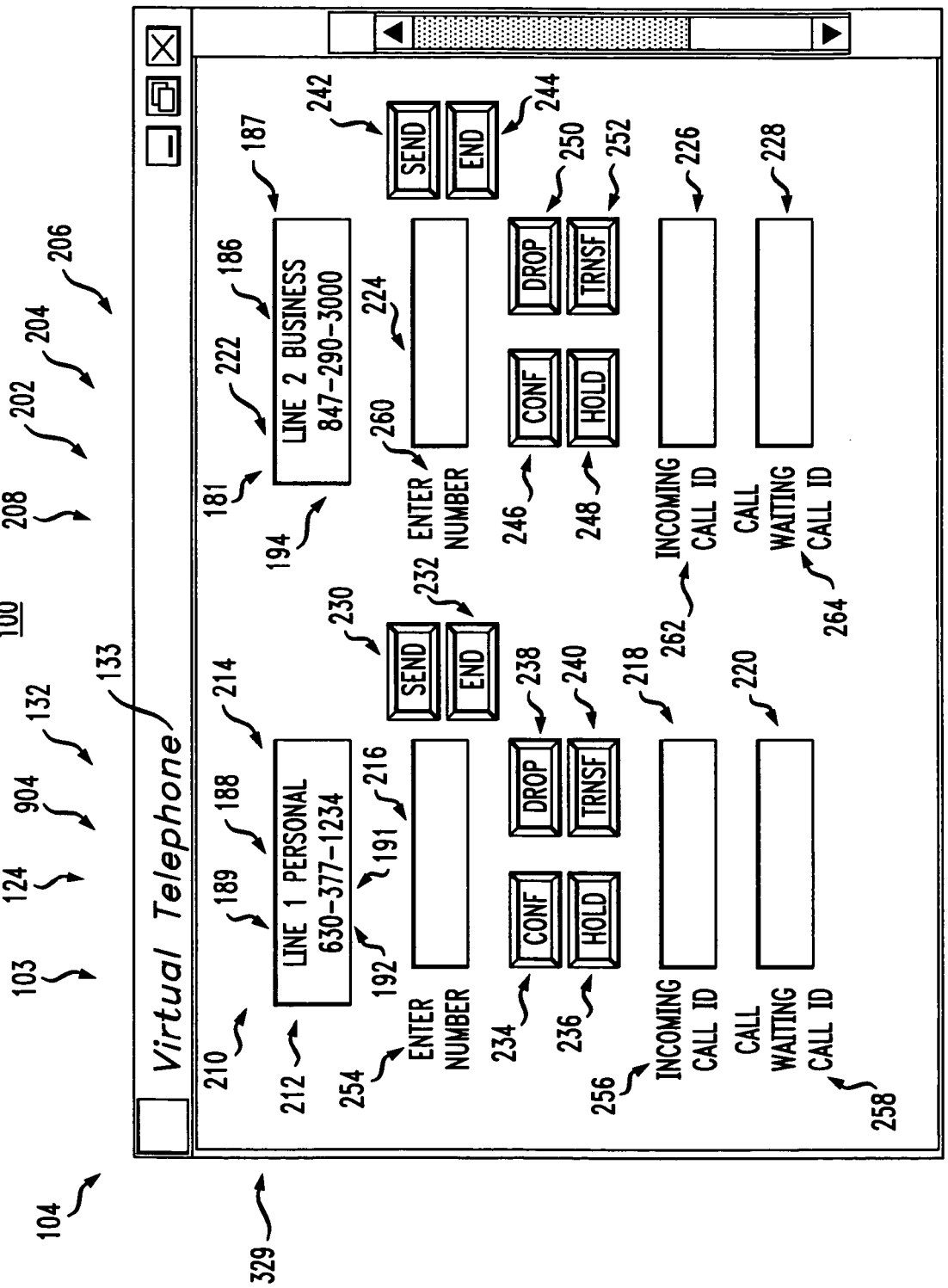
FIG. 4 represents illustrative details of another example of an interface of a phone of the system of FIG. 1.

Further referring to FIG. 1, personal computer 135 in one example comprises one or more instances of interface 204. Exemplary instances of interface 204 comprise interfaces 902 (FIG. 2) and 904 (FIG. 4). For example, interface 204 comprises an interface for one or more instances of user 137. In one example, interface 204 comprises one or more instances of keyboard 125. In a further example, interface 204 comprises one or more of a mouse, pointing device, cursor (not shown) and the like, as will be appreciated by those skilled in the art.

Referring still to FIG. 1, interface 204 in one example comprises phone 124. Phone 124 in one example comprises connector component 103. Connector component 103 in one example is operationally connectable through packet network 119 to any selected one or more of a plurality of instances of switch component 116. The any selected one or more of the plurality of instances of switch component 116 in one example serve to provide originating and/or terminating telecommunication service to phone 124.

Again referring to FIG. 1, originating telecommunication service in one example allows a subscriber to initiate a telephone call into public switched telephone network ("PSTN") 172 that can terminate on any other phone. In a further example, originating phone service includes a number of features associated with originating phone calls such as billing, three-way calling, call blocking, and the like. Terminating phone service in one example allows a subscriber to receive a call from other phones connected to public switched telephone network 172. In a further example, terminating phone service includes a number of features for managing terminating calls such as call waiting, caller identification ("caller ID"), voice mail and the like.

Still referring to FIG. 1, operational connection of connector component 103 through packet network 119 to any selected one or more of a plurality of instances of switch component 116 in one example comprises employment of one or more of interfaces 902 (FIG. 2) and 904 (FIG. 4) and one or more portions of one or more of exemplary logics 302 (FIG. 3), 402 (FIG. 5), and 502 (FIG. 6), as described herein. For example, an instance of connector component 103 that is operationally connectable through packet network 119 to any selected one or more of a plurality of instances of switch component 116, comprises an instance of connector component 103 that has been registered with the selected one or more of a plurality of instances of switch component 116.

Referring again to FIG. 1, in one example, connector component 103 employs explicit selection 918 of a particular instance of switch component 116, to operationally connect phone 124 through packet network 119 to the particular instance of switch component 116. Explicit selection 918 in one example comprises employment by user 137 of one or more portions of exemplary logic 302 (FIG. 3), as described herein. In one example, user 137 inputs explicit selection 918 through employment of interface 902 and uniform resource locator ("URL") 908 (FIG. 3), to select a particular instance of switch component 116, for example, that is owned and/or operated by an instance of service provider 117. An illustrative description of exemplary logic 302 is presented herein.

In a further example, referring to FIG. 1, different instances of service provider 117 own and/or operate different instances of switch component 116. In a still further example, an instance of service provider 117 owns and/or operates a plurality of instances of switch component 116, for example, that comprise a subset of multiple instance of switch component 116 in system 100.

Still referring to FIG. 1, one example of operational connection of connector component 103 to any selected instance of switch component 116 through packet network 119 comprises registration of phone 124 with an instance of service provider 117 that is associated with the selected instance of switch component 116. An illustrative description of exemplary operation of connector component 103 is presented herein.

Again referring to FIG. 1, connector component 103 in one example comprises logic implementation 196. Logic implementation 196 in one example comprises one or more of software application program 199 and logic implementation 329. Logic implementation 329 in one example is located on an instance of recordable data storage medium 102 of personal computer 135. In one example, logic implementation 196 accesses one or more instances of passage 110, for example, an instance of line 113. Line 113 in one example comprises virtual voice line 198. For example, logic implementation 196 serves to support one or more (e.g., two) instances of virtual voice line 198. Virtual voice line 198 in one example provides the signaling information and bearer (e.g., voice) information associated with a telephone line. In one example, virtual voice line 198 uses data packets to carrier the bearer (e.g., voice) information, as will be appreciated by those skilled in the art.

Referring further to FIG. 1, in one example, personal computer 135 employs transmission control protocol/Internet protocol ("TCP/IP") 131, for example, to send one or more instances of message 111 over one or more instances of passage 110.

Referring still to FIG. 1, passage 110 in one example comprises a communications passage. In a further example, passage 110 comprises line 113. For example, passage 110 serves to communicate one or more instances of message 111. In one example, passage 110 comprises a number of portions of one or more of an electrical path, an optical path, a wireless path, a wireline path, a hardware path, and a software path. Exemplary instances of passage 110 comprise passages 138, 140, 142, 144, 146, 148, 150, 152, 154, 156, 158, 160, and 193.

Referring again to FIG. 1, passage 138 in one example comprises a continuous connection for data communication between modem 106 and personal computer 135. In one example, passage 138 comprises one or more of asymmetric digital subscriber loop line 197 and one or more instances of virtual voice line 198, for example, voice over Internet protocol "VoIP") virtual business line 186 and/or voice over Internet protocol virtual personal line 188. Voice over Internet protocol virtual business line 186 in one example comprises H.323 voice over Internet protocol derived virtual voice line 187. Voice over Internet protocol virtual personal line 188 in one example comprises H.323 voice over Internet protocol virtual voice line 189, as will be appreciated by those skilled in the art.

Referring further to FIG. 1, passage 144 in one example comprises voice of Internet protocol virtual local line 145. Passage 152 in one example comprises voice of Internet protocol virtual foreign exchange ("FX") line 153, as will be appreciated by those skilled in the art.

Again referring to FIG. 1, gateway 114 in one example comprises voice over Internet protocol gateway 161. Exemplary instances of voice over Internet protocol gateway 161 comprise voice over Internet protocol gateways 161 (e.g., voice over Internet protocol gateways 162 and 164). Voice over Internet protocol gateway 162 in one example comprises H.323 gateway 163. Voice over Internet protocol gateway 164 in one example comprises H.323 gateway 165.

Referring still to FIG. 1, exemplary instances of switch component 116 comprise switch components 166 and 168. Switch component 166 in one example is coupled with voice over Internet protocol gateway 162. Switch component 168 in one example is coupled with voice over Internet protocol gateway 164.

Further referring to FIG. 1, an instance of switch component 116 in one example is associated with an instance of service provider 117 of system 100. Exemplary instances of service provider 117 comprise service providers 121 and 123. Service provider 121 in one example owns and/or operates switch component 166. Service provider 123 in one example owns and/or operates switch component 168. In another example, switch components 166 and 168 are owned and/or operated by a same instance of service provider 117.

Still referring to FIG. 1, voice over Internet protocol gateway 162 in one example is owned and/or operated by a same instance of service provider 117 that owns and/or operates switch component 166. In another example, voice over Internet protocol gateway 162 in one example is owned and/or operated by a different instance of service provider 117 from an instance of service provider 117 that owns and/or operates switch component 166. Voice over Internet protocol gateway 164 in one example is owned and/or operated by a same instance of service provider 117 that owns and/or operates switch component 168. In a further example, voice over Internet protocol gateway 164 in one example is owned and/or operated by a different instance of service provider 117 from an instance of service provider 117 that owns and/or operates switch component 168. In a still further example, voice over Internet protocol gateways 161 (e.g., voice over Internet protocol gateways 162 and 164) are owned and/or operated by a same instance of service provider 117. In yet another example, voice over Internet protocol gateways 161 (e.g., voice over Internet protocol gateways 162 and 164) are owned and/or operated by different instances of service provider 117.

Again referring to FIG. 1, phone 124 in one example is registrable with any selected one of a plurality of instances of service provider 117. In one example, phone 124 is registrable with a first instance of switch component 116 of a first instance of service provider 117 at a first exemplary time, and phone 124 is registrable with a second instance of switch component 116 of a second instance of service provider 117 at a second exemplary time. For example, phone 124 is registrable with switch component 166 of service provider 121 at a first exemplary time, and phone 124 is registrable with switch component 168 of service provider 123 at a second exemplary time. In one example, the first exemplary time comprises a portion that is contemporaneous with a portion of the second exemplary time. For example, the first exemplary time and the second exemplary time are overlapping and/or concurrent. In another example, the first exemplary time comprises no portion that is contemporaneous with a portion of the second exemplary time. For example, the first exemplary time and the second exemplary time are one or more of distinct, non-overlapping, and sequential. An illustrative discussion of exemplary registration of phone 124 is presented herein, for explanatory purposes.

Referring still to FIG. 1, exemplary instances of network 118 comprise packet network 119 and public switched telephone network 172. Packet network 119 in one example comprises Internet protocol/asynchronous transfer mode ("IP/ATM") network 170. Database 122 in one example comprises an exemplary instance of recordable data storage medium 102. One exemplary instance of registration server 920 comprises registration database 176, for example, coupled with an instance of network 118 such as packet network 119.

Referring further to FIG. 1, virtual business line 189 can be assigned to any selected one of a plurality of instances of Centrex group 173 of system 100. For example, phone 124 is registrable with a first instance of Centrex group 173 at an first exemplary time, and phone 124 is registrable with a second instance of Centrex group 173 at an second exemplary time. In one example, the first exemplary time comprises a portion that is contemporaneous with a portion of the second exemplary time. For example, the first exemplary time and the second exemplary time are overlapping and/or concurrent. In another example, the first exemplary time comprises no portion that is contemporaneous with a portion of the second exemplary time. For example, the first exemplary time and the second exemplary time are one or more of distinct, non-overlapping, and sequential. An illustrative discussion of exemplary registration of phone 124 is presented herein, for explanatory purposes.

Figure 3:
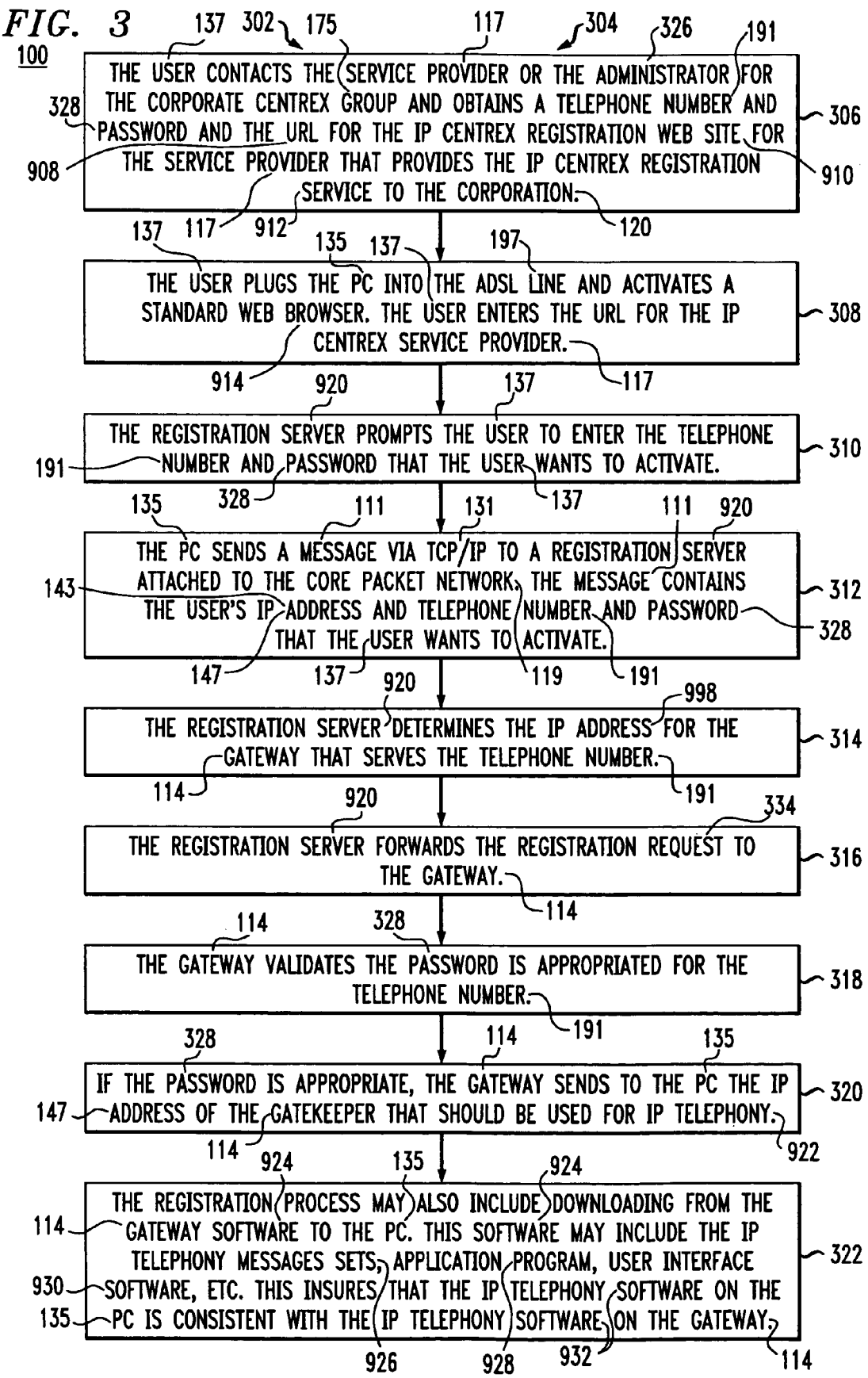
FIG. 3 represents one example of logic that is employable by the system of FIG. 1.

Turning to FIG. 3, exemplary logic 302 in one example comprises one or more instances of STEP 304. Exemplary instances of STEP 304 comprise STEPS 306, 308, 310, 312, 314, 316, 318, 320, and 322.

Figure 2:
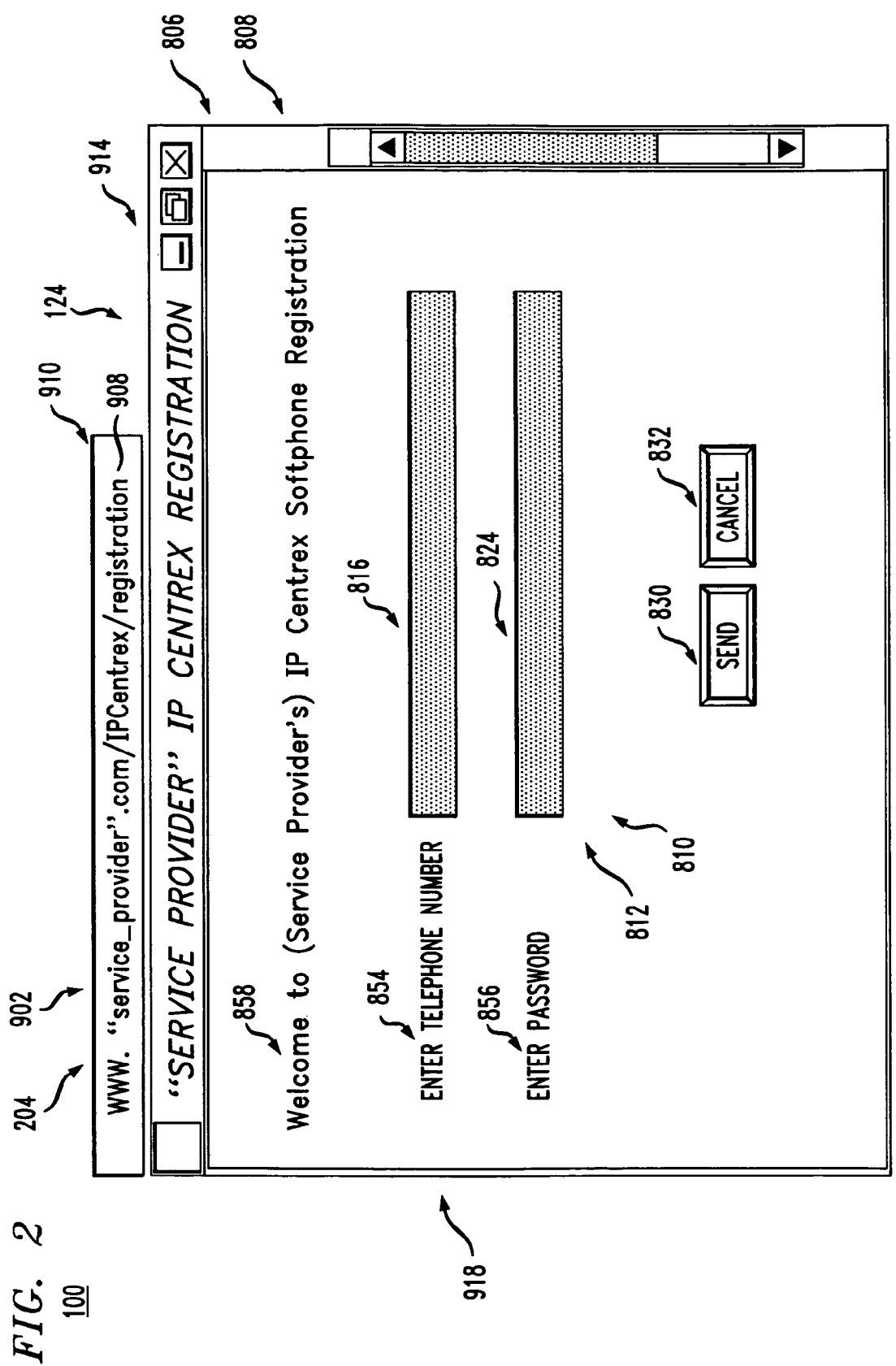
FIG. 2 represents illustrative details of one example of an interface of a phone of the system of FIG. 1.

Referring to FIGS. 1–3, at STEP 306 in one example user 137 contacts one or more of service provider 117 and administrator 326, for example, for corporate Centrex group 175. User 137 in one example obtains an instance of phone number 191 and an instance of password 328. Called numbers 192 and 194 in one example comprise exemplary instances of phone number 191. In a further example, user 137 obtains uniform resource locator 908. Uniform resource locator 908 in one example is associated with Internet protocol Centrex registration server 910 for an instance of service provider 117 that provides Internet protocol Centrex registration service 912 to corporate location 120. STEP 306 in one example proceeds to STEP 308.

Still referring to FIGS. 1–3, at STEP 308 in one example user 137 employs an instance of logic implementation 329, for example, located on an instance of recordable data storage medium 102 of personal computer 135. Logic implementation 329 in one example comprises a browser such as World Wide Web browser 914. In one example, at STEP 308 user 137 plugs personal computer 135 into asymmetric digital subscriber loop line 197, and activates World Wide Web browser 914. In a further example, at STEP 308 user 137 enters uniform resource locator 908 for the instance of service provider 117 that provides Internet protocol Centrex registration service 912 to corporate location 120. STEP 308 in one example proceeds to STEP 310.

Further referring to FIGS. 1–3, at STEP 310 in one example registration server 920 serves to prompt user 137 to enter one or more instances of phone number 191. Registration server 920 in one example comprises a server for Internet protocol Centrex registration server 910. For example, registration server 920 serves to prompt user 137 to enter an instance of phone number 191 and an instance of password 328 that user 137 wishes to activate.

Referring to FIG. 2, interface 902 in one example comprises an instance of graphical user interface ("GUI") 806. In one example, interface 902 comprises layout 808. For example, interface 902 comprises one or more instances of graphic component 810. Graphic component 810 in one example comprises one or more instances of icon 812. Exemplary instances of graphic component 810 comprise fields 816 and 824, buttons 830 and 832, and descriptive information 854, 856, and 858.

Again referring to FIGS. 1–3, in a further example, at STEP 310 user 137 enters into field 816 an instance of phone number 191 that user 137 wishes to activate, and enters into field 824 an instance of password 328 that user 137 wishes to activate. STEP 310 in one example proceeds to STEP 312.

Referring still to FIGS. 1–3, at STEP 312 in one example personal computer 135 sends one or more instances of message 111. For example, personal computer 135 employs transmission control protocol/Internet protocol 131 to send an instance of message 111 to registration server 920. Registration server 920 in one example is attached to packet network 119. The instance of message 111 in one example comprises an instance of address 143, and the instance of phone number 191 and the instance of password 328 that user 137 wishes to activate. The instance of address 143 in one example is associated with personal computer 135 of user 137. STEP 312 in one example proceeds to STEP 314.

Again referring to FIGS. 1–3, at STEP 314 in one example registration server 920 determines an instance of Internet protocol address 998 for voice over Internet protocol gateway 164 that serves the instance of phone number 191. In one example, voice over Internet protocol gateway 164 is connected with an instance of switch component 116 that provides Centrex services to a Centrex group with which a user is registering. STEP 314 in one example proceeds to STEP 316.

Still referring to FIGS. 1–3, at STEP 316 in one registration server 920 sends one or more instances of message 111. For example, registration server 920 sends an instance of registration request 334 that comprises an instance of message 111, to the instance of gateway 114 for the instance of phone number 191. STEP 316 in one example proceeds to STEP 318.

Referring again to FIGS. 1–3, at STEP 318 in one example the instance of voice over Internet protocol gateway 164 for the instance of phone number 191 determines that the instance of password 328 is correct for the instance of phone number 191. For example, the instance of voice over Internet protocol gateway 164 for the instance of phone number 191 validates the instance of password 328. STEP 318 in one example proceeds to STEP 320.

Further referring to FIGS. 1–3, at STEP 320 in one example if the instance of voice over Internet protocol gateway 164 for the instance of phone number 191 determine that the instance of password 328 is correct for the instance of phone number 191, then the instance of voice over Internet protocol gateway 164 for the instance of phone number 191 sends to personal computer 135 of user 137, an instance of Internet protocol address 147 that is associated with an instance of voice over Internet protocol gateway 164, for example, that is to be used for Internet protocol telephony 922. In one example, STEP 320 terminates exemplary logic 302. In another example, STEP 320 proceeds to STEP 322.

Referring again to FIGS. 1–3, at STEP 322 in one example the instance of voice over Internet protocol gateway 164 for the instance of phone number 191 downloads one or more instances of software 924 to personal computer 135 of user 137. Exemplary instances of software 924 comprise one or more instances of Internet protocol telephony messages set 926, one or more instances of application program 928, and one or more instances of user interface software 930, as will be appreciated by those skilled in the art. In one example, STEP 322 serves to ensure that one or more instances of Internet protocol telephony software 932 located on personal computer 135 of user 137, are consistent with one or more instances of Internet protocol telephony software 932 located on the instance of voice over Internet protocol gateway 164 for the instance of phone number 191.

Now referring to FIGS. 1 and 4, phone 124 in one example comprises one or more of voice over Internet protocol phone 132 and soft phone 202. For example, soft phone 202 comprises virtual telephone 133. Soft phone 202 in one example is based at personal computer 135.

Referring again to FIGS. 1 and 4, in one example, user 137 employs phone 124. User 137 in one example comprises one or more instances of human operator 127. In a further example, user 137 comprises one or more instances of computing device 129.

Still referring to FIGS. 1 and 4, in one example, user 137 comprises user 139 that spends a portion of time at home location 108 and a portion of time at corporate location 120. In another example, user 137 comprises user 141 that works (e.g., primarily) from one or more locations other than corporate location 120, for example, an instance of user 141 that works (e.g., primarily) at home location 108 and/or one or more locations other than corporate location 120. In one example, user 137 gains access to Internet protocol/asynchronous transfer mode network 170 from various remote locations, for example, using any one of several (e.g., standard) remote access arrangements such as dial-up modems. In another example, user 137 gains access to Internet protocol/asynchronous transfer mode network 170 from various remote locations via a remote instance of service provider 117, for example, a remote instance of an Internet Service provider.

Further referring to FIGS. 1 and 4, interface 904 in one example comprises graphical user interface 206. In one example, interface 904 comprises layout 208. For example, interface 904 comprises one or more instances of graphic component 210. Graphic component 210 in one example comprises one or more instances of icon 212. Exemplary instances of graphic component 210 comprise fields 216 and 224, displays 214, 218, 220, 222, 226, and 228, buttons 230, 232, 234, 236, 238, 240, 242, 244, 246, 248, 250, and 252, and descriptive information 254, 256, 258, 260, 262, and 264.

Again referring to FIGS. 1 and 4, phone 124 in one example comprises one or more instances of call appearance 180. Call appearance 180 in one example comprises shared call appearance 181. Shared call appearance 181 in one example comprises an electronic implementation of an extension phone. For example, call appearance 180 comprises a call appearance that phone 124 shares with one of the phones of Centrex group 173. Exemplary instances of call appearance 180 comprise call appearances 182 and 184. In one example, phone 124 shares call appearance 182 with phone 126. For example, if a call attempts to terminate at phone 126, call appearance 182 in one example serves to cause both phone 126 and phone 124 to generate an alerting tone, and either phone 126 or phone 124 in one example can answer the call. In another example, phone 124 shares call appearance 184 with phone 130.

Referring still to FIGS. 1 and 4, switch 166 in one example serves to support call appearance 182. Switch 168 in one example serves to support call appearance 184. Interface 204 in one example serves to present an instance of graphical user interface 206 for shared call appearance 182 supported by switch component 166 and an instance of graphical user interface 206 for shared call appearance 184 supported by switch component 168. For example, interface 904 serves to present a plurality of instances of graphical user interface 206 for shared instances of call appearances 182 and 184 that are each supported by respective instances of switch components 166 and 168.

Further referring to FIGS. 1 and 4, user 137 in one example sends and/or receives one or more instances of call 190 through any corresponding one or more of a plurality of instances of call appearance 180. For example, user 137 sends and/or receive calls from either of shared call appearances 182 and 184. In one example, such an implementation of system 100 advantageously simplifies wiring for premises such as home location 108, by providing a plurality of (e.g., two) instances of virtual line 105 on one instance of line 113. For example, such an implementation of system 100 advantageously simplifies wiring for premises such as home location 108, by providing both voice over Internet protocol virtual business line 186 and also voice over Internet protocol virtual personal line 188 on passage 138. Such an implementation of system 100 in one example advantageously allows user 137 to conveniently originate outgoing calls with billing appropriately charged to (e.g., business) phone 130 or (e.g., personal) phone 126.

Turning to FIG. 5, exemplary logic 402 in one example comprises one or more instances of STEP 404. Exemplary instances of STEP 404 comprise STEPS 406, 408, 410, 412, 414, 416, and 418.

Referring again to FIG. 5, at STEP 406 in one example user 137 employs an instance of logic implementation 329, for example, located on an instance of recordable data storage medium 102 of personal computer 135. Logic implementation 329 in one example comprises multi-call appearance virtual telephone application software program 420. STEP 406 in one example proceeds to STEP 408.

Referring still to FIG. 5, at STEP 408 in one example user 137 enters an instance of called phone number 195 into field 216 or 224. In one example, user 137 enters called number 195 for voice over Internet protocol virtual personal line 188 into field 216. In another example, user 137 enters called number 195 for voice over Internet protocol virtual business line 186 into field 224. STEP 408 in one example proceeds to STEP 410.

Further referring to FIG. 5, at STEP 410 in one example user 137 activates button 230 or 242, for example, to set up an instance of call 190 to an instance of phone number 195. STEP 410 in one example proceeds to STEP 412.

Again referring to FIG. 5, at STEP 412 in one example multi-call appearance virtual telephone application software program 420 obtains an instance of Internet protocol address 147, for example, for an instance of voice over Internet protocol gateway 161 (e.g., voice over Internet protocol gateway 162 or 164) that corresponds to the corresponding instance of call appearance 182 or 184. For example, multi-call appearance virtual telephone application software program 420 accesses one or more of an instance of recordable data storage medium 102 of personal computer 135, to obtain the instance of Internet protocol address 147. STEP 412 in one example proceeds to STEP 414.

Still referring to FIG. 5, at STEP 414 in one example personal computer 135 serves to format an instance of message 111. For example, personal computer 135 serves to format an instance of message 111 that comprises H.323 call request message 422. H.323 call request message 422 in one example comprises information 424 and information 426. Information 424 in one example comprises information that is based on the instance of the called phone number 195 that user 137 has entered into field 216 or 224. In a further example, the H.323 call request message 422 comprises phone number 191 of an instance of call appearance 180, for example, call appearance 182 or 184, that initiated the call request. Information 426 in one example comprises destination address 428, for example, for the corresponding instance of voice over Internet protocol gateway 161 (e.g., voice over Internet protocol gateway 162 or 164). In one example, H.323 call request message 422 comprises source address 428. Source address 428 in one example comprises an instance of Internet protocol address 147 for personal computer 135. STEP 414 in one example proceeds to STEP 416.

Again referring to FIG. 5, at STEP 416 in one example personal computer 135 sends H.323 call request message 422, for example, over network 118 to the instance of voice over Internet protocol gateway 161 (e.g., voice over Internet protocol gateway 162 or 164). For example, personal computer 135 sends H.323 call request message 422 over Internet protocol/asynchronous transfer mode network 170. STEP 416 in one example proceeds to STEP 418.

Referring still to FIG. 5, at STEP 418 in one example the instance of voice over Internet protocol gateway 161 (e.g., voice over Internet protocol gateway 162 or 164) receives H.323 call request message 422. Therefore, voice over Internet protocol gateway 161 (e.g., voice over Internet protocol gateway 162 or 164) initiates call setup sequence 430. For example, voice over Internet protocol gateway 161 (e.g., voice over Internet protocol gateway 162 or 164) initiates a standard instance of H.323 call setup sequence 432, for example, as an exemplary instance of call setup sequence 430.

Referring still to FIG. 5, at STEP 418 in one example the instance of voice over Internet protocol gateway 161 (e.g., voice over Internet protocol gateway 162 or 164) receives H.323 call request message 422, for example, from phone 124. In a further example, voice over Internet protocol gateway 161 (e.g., voice over Internet protocol gateway 162 or 164) in turn initiates call setup 430 through an instance of switch component 166 or 168, for example, using any selected one of a variety of instances of signaling format 432. Exemplary instances of signaling format 432 comprise analog touch tones, integrated services digital network Q.931 signaling, and GR303 integrated digital loop carrier signaling, as will be appreciated by those skilled in the art.

Turning to FIG. 6, exemplary logic 502 in one example comprises one or more instances of STEP 504. Exemplary instances of STEP 504 comprise STEPS 506, 508, 510, 512, 514, 516, 518, 520, and 522.

Referring again to FIG. 6, at STEP 506 in one example an instance of voice over Internet protocol gateway 161 (e.g., voice over Internet protocol gateway 162 or 164) receives an instance of message 111. For example, voice over Internet protocol gateway 114 receives an instance of request 524 that comprises an instance of message 111. Request 524 in one example comprises a request from an instance of switch 116 to complete an instance of call 190, for example, to an instance of line 113, for example, served by the instance of voice over Internet protocol gateway 114. In one example, request 524 comprises a request from an instance of switch 116 to complete an instance of call 190 to an instance of line 113, for example, analog line 526 or integrated services digital network ("ISDN") line 528. For example, voice over Internet protocol gateway 114 detects the instance of request 524 from the instance of switch 116 to complete an instance of incoming call 530 that comprises an exemplary instance of call 190. In one example, an instance of request 524 is directed to an instance of analog line 526, and the instance of voice over Internet protocol gateway 114 therefore detects ringing current 532 on the instance of analog line 526. In another example, an instance of request 524 is directed to an instance of integrated services digital network line 528, and the instance of voice over Internet protocol gateway 114 therefore receives an instance of message 111, for example, an instance of Q.931 call request message 534. STEP 506 in one example proceeds to STEP 508.

Still referring to FIG. 6, at STEP 508 in one example voice over Internet protocol gateway 114 obtains an instance of Internet protocol address 147. The instance of Internet protocol address 147 in one example corresponds to the Internet protocol address for personal computer 135 of user 137. STEP 508 in one example proceeds to STEP 510.

Further referring to FIG. 6, at STEP 510 in one example voice over Internet protocol gateway 114 outputs one or more instances of message 111. For example, voice over Internet protocol gateway 114 generates an instance of H.323 call setup request message 536 that comprises one exemplary instance of message 111. H.323 call setup request message 536 in one example comprises one or more instances of Internet protocol address 147, for example, Internet protocol destination address 538 and Internet protocol source address 540. Internet protocol destination address 538 in one example comprises an instance of Internet protocol address 147 that corresponds to personal computer 135 of user 137. Internet protocol source address 540 in one example corresponds to an instance of Internet protocol address 147 for the instance of voice over Internet protocol gateway 114. In a further example, H.323 call setup request message 536 comprises incoming caller identification ("ID") information 542. STEP 510 in one example proceeds to STEP 512.

Referring still to FIG. 6, at STEP 512 in one example voice over Internet protocol gateway 114 sends H.323 call setup request message 536 over Internet protocol/asynchronous transfer mode network 170 to personal computer 135. STEP 512 in one example proceeds to STEP 514.

Referring further to FIG. 6, at STEP 514 in one example personal computer 135 receives H.323 call setup request message 536. For example, personal computer 135 directs H.323 call setup request message 536 to multi-call appearance virtual telephone application software program 420. STEP 514 in one example proceeds to STEP 516.

Again referring to FIG. 6, at STEP 516 in one example multi-call appearance virtual telephone application software program 420 employs Internet protocol source address 540 to select an instance of (e.g., graphical user) interface 204 to use for shared call appearance 180 to employ for the instance of incoming call 530. STEP 516 in one example proceeds to STEP 518.

Further referring to FIG. 6, at STEP 518 in one example multi-call appearance virtual telephone application software program 420 presents information 544. Information 544 in one example comprises one or more of alert 546 and information 548. Alert 546 in one example comprises ringing sound 550. Information 548 in one example comprises incoming caller identification information 542. Multi-call appearance virtual telephone application software program 420 in one example displays incoming caller identification information 542 in display 218 or 226 for the instance of (e.g., graphical user) interface 204. STEP 518 in one example proceeds to STEP 520.

Referring again to FIG. 6, at STEP 520 in one example user 137 receives incoming call 530. For example, user 137 answers call 530 by activating button 230 or 242 for the instance of shared call appearance 180. In one example, user 137 activates button 230 or 242 by clicking the button 230 or 242. STEP 520 in one example proceeds to STEP 522.

Still referring to FIG. 6, at STEP 522 in one example personal computer 135 and voice over Internet protocol gateway 161 (e.g., voice over Internet protocol gateway 162 or 164) execute call setup message sequence 550. Message sequence 550 in one example comprises one or more of voice over Internet protocol call setup message sequence 552 and H.323 voice over Internet protocol call setup message sequence 554. For example, personal computer 135 and voice over Internet protocol gateway 161 (e.g., voice over Internet protocol gateway 162 or 164) proceed with a standard instance of H.323 voice over Internet protocol call setup message sequence 554.

In one example, multi-call appearance virtual telephone application software program 420 looks at the instance of Internet protocol address 147 that is associated with the instance of voice over Internet protocol gateway 161 (e.g., voice over Internet protocol gateway 162 or 164) that initiated call setup sequence 430, to identify the instance of voice over Internet protocol gateway 161 (e.g., voice over Internet protocol gateway 162 or 164), among a plurality of instances of instance of voice over Internet protocol gateway 161 (e.g., voice over Internet protocol gateways 162 and 164). Based on this identification of the instance of voice over Internet protocol gateway 161 (e.g., voice over Internet protocol gateway 162 or 164) that initiated call setup sequence 430, multi-call appearance virtual telephone application software program 420 in one example selects the appropriate instance of (e.g., graphical user) interface 204 for an instance of shared call appearance 180 to display an incoming instance of call 190.

The flow diagrams depicted herein are just exemplary. There may be many variations to these diagrams or the steps or operations described therein without departing from the spirit of the invention. For instance, the steps may be performed in a differing order, or steps may be added, deleted, or modified.

Although exemplary embodiments of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A system, comprising:
   a first phone that comprises a connector component that is operationally connectable through a packet network to one of a plurality of switch components;
   a second phone receiving communication origination services from the one switch component and coupled to the one switch component by a path that is independent of the path by which the first phone is coupled to the one switch;
   a registration server, coupled with the packet network, that stores data permitting a user to select a telephone number supported by an associated switch component via which communication services is enabled for the first phone;
   a voice over Internet protocol (VoIP) gateway coupled to the packet network and the one switch component where the VoIP gateway provides a communication interface to facilitate communications between the packet network and the one switch component;
   wherein the one switch components serves to provide originating and terminating telecommunication service to the first phone;
   wherein first and second phones are not connected to each other as extension phones, the one switch components adapted to provide the first phone with a shared call appearance with the second phone through the packet network based on an IP address of the first phone received from the registration server;
   wherein the shared call appearances of the first and second phones causes the second phone serves as an electronic implementation of an extension of the first phone.

2. A system, comprising:
   a first phone that is operationally connectable through a packet network to any selected one of a plurality of switch components;
   wherein the any selected one or more of the plurality of switch components serve to provide one or more of originating and terminating telecommunication service to the first phone;
   wherein the first phone has a shared call appearance with a second phone over the switch component of the plurality of switch components and through the packet network;
   wherein the shared call appearances of the first and second phones means the second phone serves as an electronic implementation of an extension phone of the first phone; wherein the first phone shares a second shared call appearance with a third phone over a second switch component and through the packet network.

3. A method, comprising the steps of:
   storing at one switch component a telephone number selected for association with a first phone that comprises a connector component that is operationally connectable through a packet network to the one switch component that supports originating and terminating communication services for the first phone, the one switch component also storing an IP address of the first phone;
   providing communication services by the one switch component to a second phone so that the first phone has a shared call appearance with a second phone where communications to the first phone is based on the IP address of the first phone, the second phone receiving communication origination services from the one switch component and coupled to the one switch component by a path that is independent of another path by which the first phone is coupled to the one switch, the first and second phones not being connected to each other as extension phones;
   wherein the shared call appearances of the first and second phones causes the second phone to serve as an electronic implementation of an extension of the first phone.

4. The method of claim 3, further comprising the step of providing a telephony to Internet protocol interface via a voice over Internet protocol gateway for communications between the first phone and the any selected one of the plurality of switch components.

5. The method of claim 3, wherein the step of selecting comprises the step of:
   selecting the telephone number of the second phone to be registrable with the first phone via a registration server.

6. A method, comprising the steps of:
   selecting a telephone number to be associated with a first phone where the first phone comprises a connector component that is operationally connectable through a packet network to any selected one or more of a plurality of switch components;
   wherein the any selected one or more of the plurality of switch components serves to provide originating and terminating telecommunication service to the first phone;
   the telephone number also being associated with a second phone supported by the any selected one or more of the plurality of switch components so that the first phone has a shared call appearance with the second phone over the any one of the plurality of switch components and through the packet network, wherein the second phone comprises the shared call appearance with the first phone over the switch component and through a network, the first and second phones not being connected to each other as extension phones;
   wherein the shared call appearances of the first and second phones causes the second phone to serve as an electronic implementation of an extension phone of the first phone;
   selecting the first phone to comprise a second shared call appearance with a third phone over a second switch component and through the packet network, wherein the third phone comprises the second shared call appearance with the first phone over the second switch component and through a network.

* * * * *